(12) United States Patent
Sakuma

(10) Patent No.: US 8,913,303 B2
(45) Date of Patent: Dec. 16, 2014

(54) IMAGE READING APPARATUS

(75) Inventor: Tomofumi Sakuma, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/452,172

(22) Filed: Apr. 20, 2012

(65) Prior Publication Data

US 2012/0274996 A1    Nov. 1, 2012

(30) Foreign Application Priority Data

Apr. 26, 2011   (JP) .................................. 2011-098424

(51) Int. Cl.
*H04N 1/04* (2006.01)
*H04N 1/00* (2006.01)
*G03G 15/00* (2006.01)
*H04N 1/12* (2006.01)
*H04N 1/193* (2006.01)

(52) U.S. Cl.
CPC .............. *G03G 15/607* (2013.01); *H04N 1/121* (2013.01); *H04N 1/00631* (2013.01); *H04N 2201/0081* (2013.01); *H04N 1/0049* (2013.01); *H04N 1/00663* (2013.01); *G03G 15/5016* (2013.01); *H04N 1/193* (2013.01)
USPC ............ 358/474; 358/475; 358/496; 358/497

(58) Field of Classification Search
USPC .................................. 358/474, 475, 496, 497
See application file for complete search history.

(56) References Cited

U.S. PATENT DOCUMENTS

| 4,761,002 | A  | * | 8/1988 | Reed et al. ..................... 271/111 |
| 8,189,239 | B2 | * | 5/2012 | Borsuk et al. ................. 358/474 |
| 8,422,934 | B2 | * | 4/2013 | Penke et al. ................... 399/405 |
| 2003/0043418 | A1 | * | 3/2003 | Tsutsumi ...................... 358/412 |
| 2003/0174355 | A1 | * | 9/2003 | Suehiro ........................ 358/1.15 |
| 2005/0286090 | A1 | * | 12/2005 | Ahne et al. .................... 358/452 |
| 2006/0210336 | A1 |   | 9/2006 | Horiguchi |
| 2009/0153916 | A1 | * | 6/2009 | Borsuk et al. ................. 358/474 |

FOREIGN PATENT DOCUMENTS

| CN | 1815377 A | 8/2006 |
| JP | 61-140439 A | 6/1986 |
| JP | 63-170849 U | 11/1988 |
| JP | 01-217447 A | 8/1989 |
| JP | 06-102733 A | 4/1994 |
| JP | 07-287479 A | 10/1995 |
| JP | 2008-10902 A | 1/2008 |
| JP | 2008-187392 A | 8/2008 |
| JP | 2010-259010 A | 11/2010 |

* cited by examiner

*Primary Examiner* — Houshang Safaipour
(74) *Attorney, Agent, or Firm* — Canon USA Inc IP Division

(57) ABSTRACT

An image reading apparatus includes a stacking unit on which a document to be fed is stacked, a sensor configured to output a signal indicating that the document has been stacked on the stacking unit, a discharging unit to which the document is to be discharged, wherein the discharging unit includes a lamp, and a control unit configured to turn on the lamp in response to the signal indicating that the document has been stacked on the stacking unit output from the sensor.

22 Claims, 6 Drawing Sheets

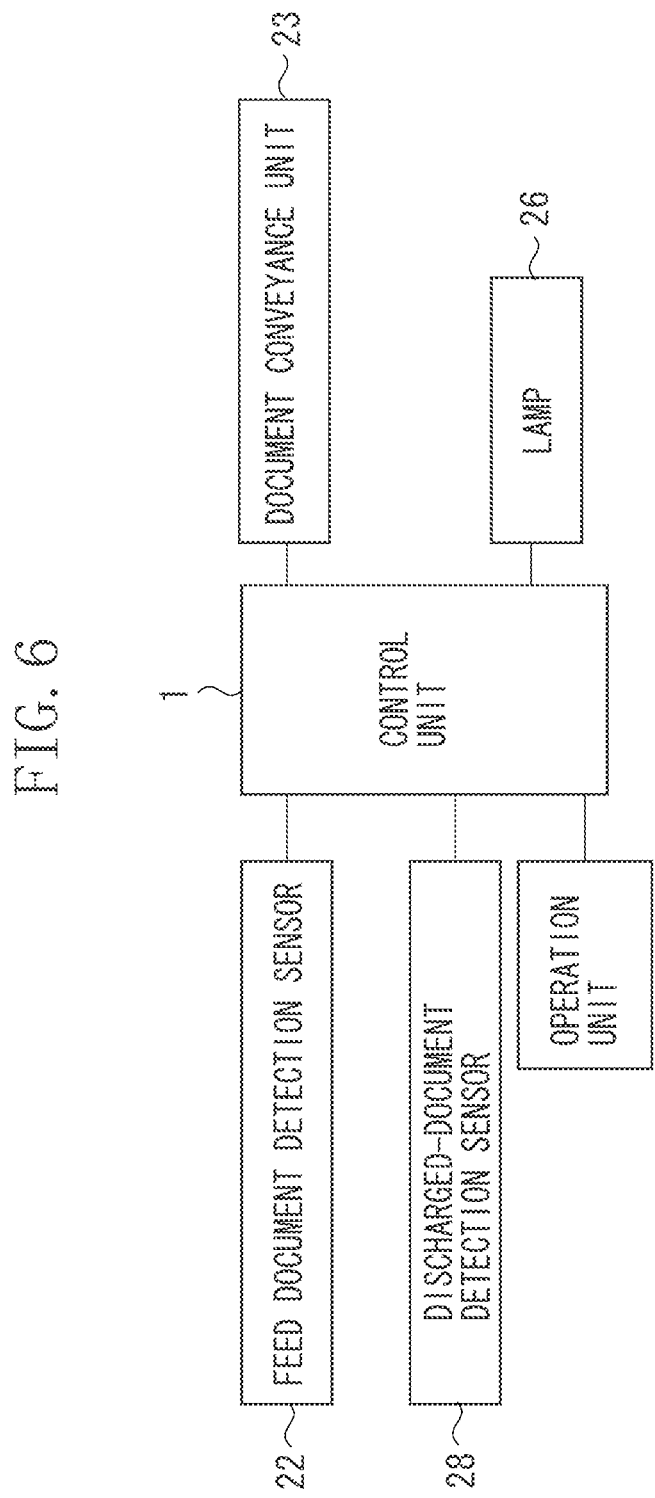

IMAGE READING APPARATUS

BACKGROUND OF THE INVENTION

1. Field of the Invention

The present invention relates to an image reading apparatus.

2. Description of the Related Art

Conventionally, an image forming apparatus such as a digital copying machine has an image reading apparatus for reading an image of a document and, based on the image that has been read by the image reading apparatus, forms an image on recording paper.

The image reading apparatus has an automatic document feeder (ADF) that conveys a document from a document stacking unit to a discharging unit, provided below the document stacking unit, via a reading position.

As the ADF discharges and stacks documents in the discharging unit, a user removes the documents from the discharging unit. However, the user may forget to remove the discharged documents from the discharging unit.

To prevent a user from forgetting to remove a discharged document, a technology for illuminating a discharging unit is proposed (See Japanese Patent Application Laid-Open No. 2008-10902). The discharging unit is illuminated to make the user aware that a document remains in the discharging unit, thereby preventing the user from forgetting to remove the document.

More specifically, when the document of which an image has been read is discharged to the discharging unit, the document is illuminated. To save electric power, the illumination ends after a predetermined time (for example, about 10 seconds) has elapsed from the start of the illumination.

The configuration described above is intended to notify the user, who has set a document on the ADF, that the user has forgotten to remove the document from the discharging unit. This sometimes results in a situation in which a next user uses the ADF without noticing that the previous user has forgotten to remove a document.

The document the previous user has forgotten to remove and the next user's document, discharged to the discharging unit after its image has been read, may be mixed in the discharging unit. In this case, there is a possibility that the next user will take away not only that user's document, but also the previous user's document from the discharging unit.

Furthermore, if a large volume of sheets of the previous user's document are left un-removed in the document discharging unit, a paper jam may occur at a discharge port of the discharging unit.

SUMMARY OF THE INVENTION

One aspect of the present invention is directed to a user-friendly document conveyance apparatus that addresses a user forgetting to remove a document from a discharging unit and allows a subsequent user to recognize that the previous user's document is in the discharging unit.

According to an aspect of the present invention, an image reading apparatus includes a stacking unit on which a document to be fed is stacked, a sensor configured to output a signal indicating that the document has been stacked on the stacking unit, a feeding unit configured to feed the document stacked on the stacking unit, a conveyance unit configured to convey the document fed by the feeding unit, an image reading unit configured to read an image of the document conveyed by the conveyance unit, a discharging unit configured to receive the document conveyed by the conveyance unit, wherein the discharging unit includes a lamp, and a control unit configured to turn on the lamp in response to the signal indicating that the document has been stacked on the stacking unit.

According to an exemplary embodiment of the present invention, the lamp provided in the discharging unit is turned on when the user sets a document on the stacking unit. The lamp can prompt the user to visually check the discharging unit to easily recognize whether the previous user has forgotten to remove a document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a control block diagram of the image reading apparatus.

DESCRIPTION OF THE EMBODIMENTS

Various exemplary embodiments, features, and aspects of the invention will be described in detail below with reference to the drawings.

Figure 1:
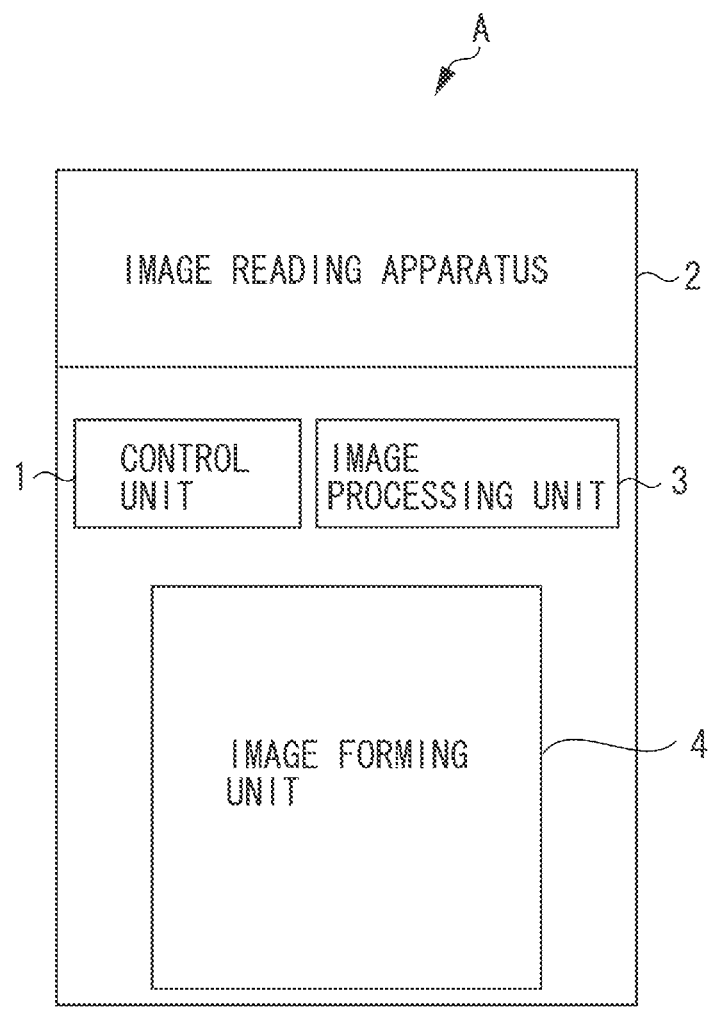
FIG. 1 is a diagram illustrating a general configuration of a copying machine having an image reading apparatus according to an exemplary embodiment of the present invention.
Figure 2A:
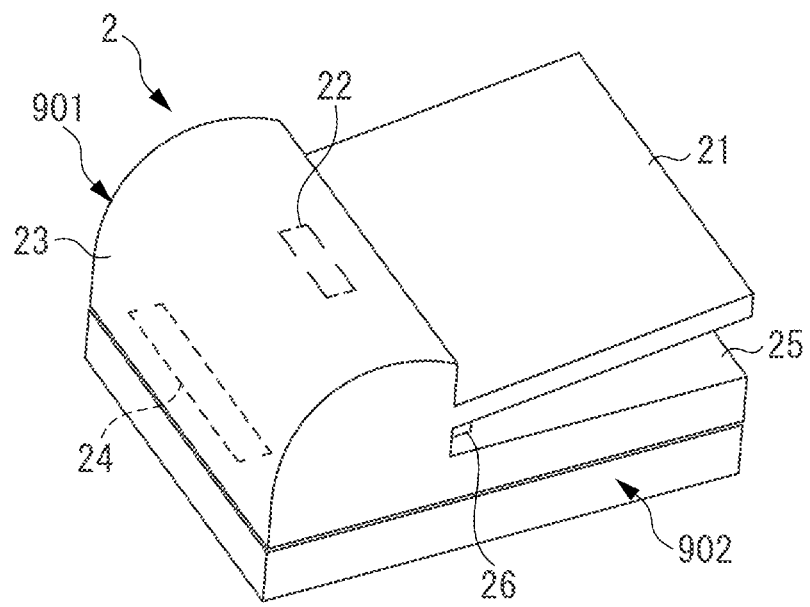
FIGS. 2A and 2B are diagrams respectively illustrating an overview of the copying machine having the image reading apparatus according to the exemplary embodiment of the present invention.
Figure 2B:
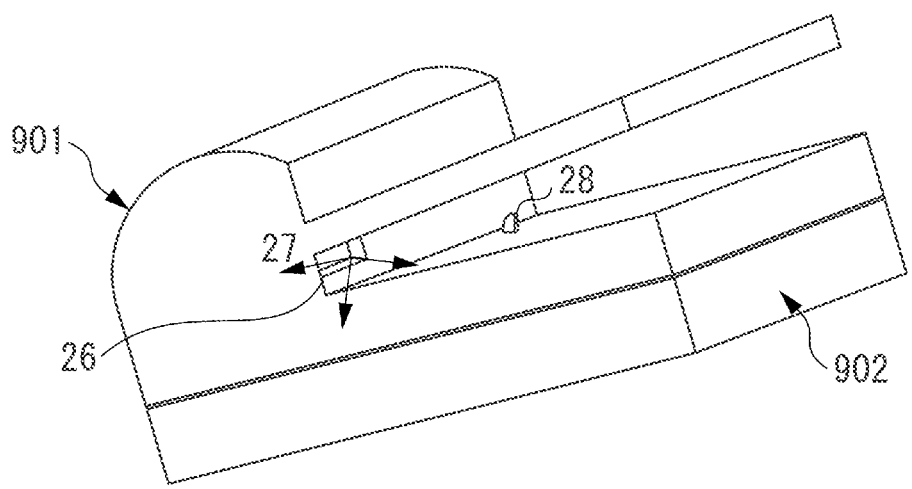
Figure 3:
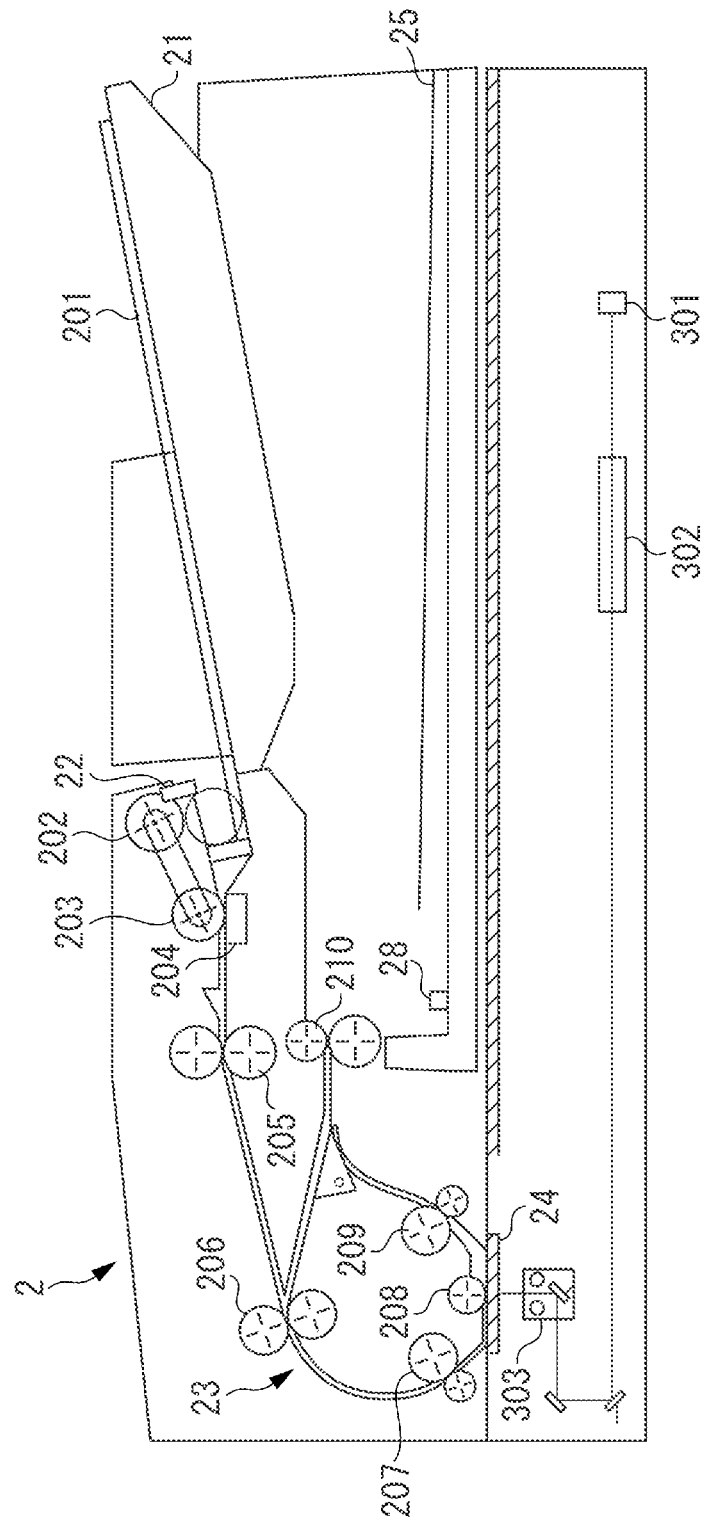
FIG. 3 is a cross sectional view of an ADF according to the exemplary embodiment the present invention.
Figure 4:
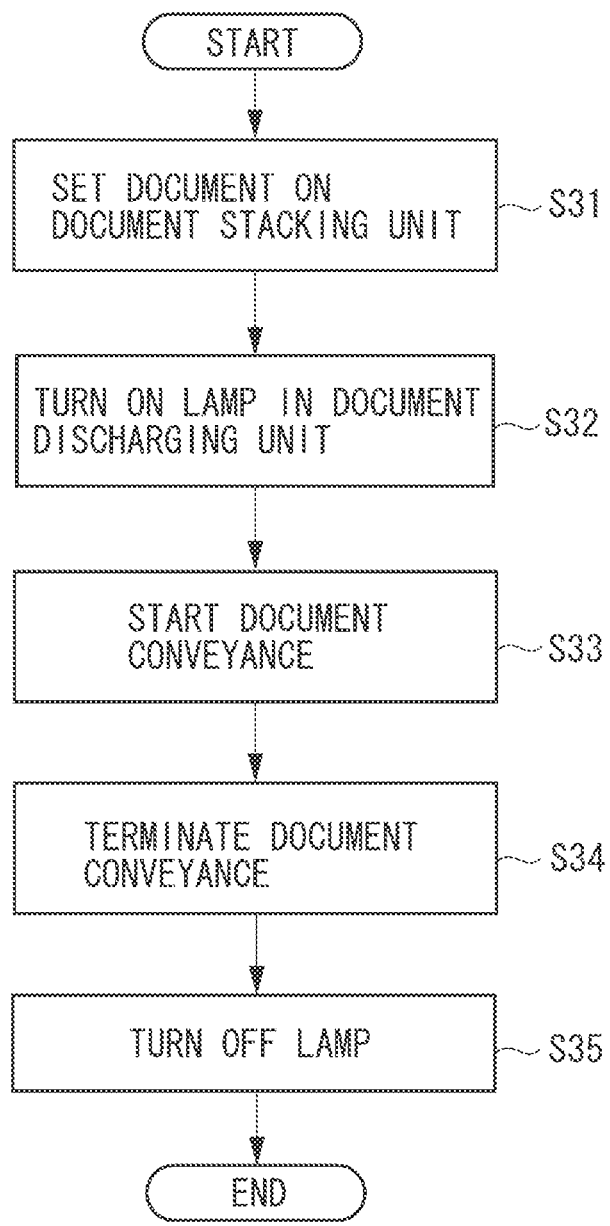
FIG. 4 is a flowchart illustrating document reading processing according to a first exemplary embodiment of the present invention.
Figure 5:
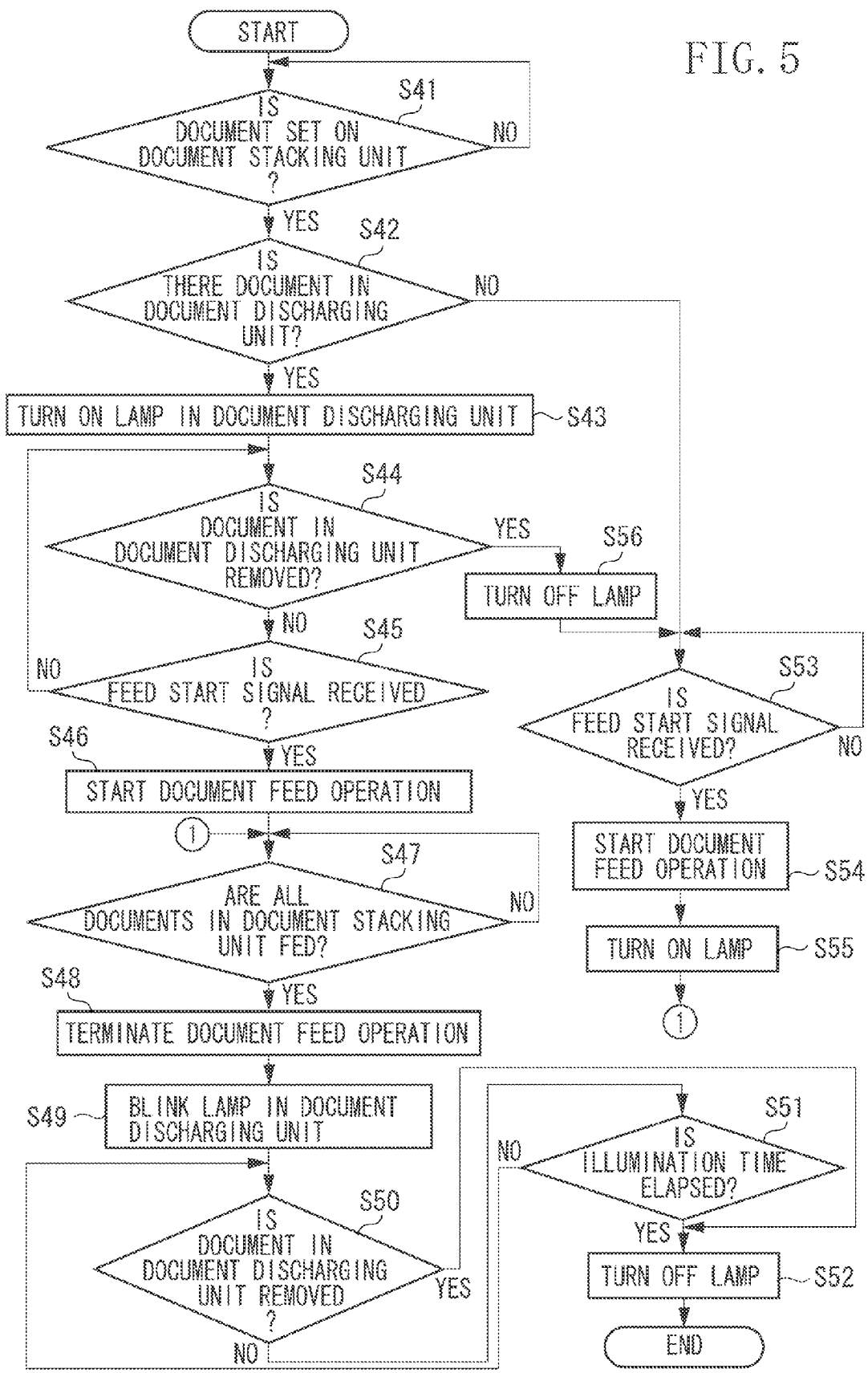
FIG. 5 is a flowchart illustrating document reading processing according to a second exemplary embodiment of the present invention.

FIG. 1 is a general diagram illustrating a configuration of a copying machine A having an image reading apparatus according to an exemplary embodiment of the present invention. FIGS. 2A and 2B are diagrams respectively illustrating a main configuration part of the image reading apparatus. FIG. 3 is a cross sectional view of the image reading apparatus. FIG. 4 is a flowchart illustrating an operation of a lamp that works as an illumination unit in document reading processing of the image reading apparatus. FIG. 5 is a flowchart illustrating the operation of the lamp in another exemplary embodiment. FIG. 6 is a control block diagram of the image reading apparatus.

As illustrated in FIG. 1, the copying machine A that works as an image forming apparatus includes an image reading apparatus 2 that reads an image of a document and an image processing unit 3 that performs image processing, such as density correction processing, for the image read by the image reading apparatus 2.

The copying machine A further includes an image forming unit 4 that transfers and fixes toner to a recording sheet based on image data for which image processing is performed by the image processing unit 3 and a control unit 1 that controls the entire copying machine A.

A general configuration of the image reading apparatus 2 will now be described with reference to perspective views illustrated in FIGS. 2A and 2B.

The image reading apparatus 2 includes a document conveyance apparatus 901 that conveys a document and an image reading apparatus body 902 that includes a reading device for reading an image of the conveyed document.

The document conveyance apparatus 901 includes a document stacking unit 21 on which the document of which an image is to be read is stacked and a feed document detection sensor 22 that configures a document detection unit for detecting that the document is stacked on the document stacking unit 21. The feed document detection sensor 22 outputs the signal indicating that the document has been stacked on the document stacking unit 21.

The document conveyance apparatus 901 further includes a document conveyance unit 23 that conveys the document stacked on the document stacking unit 21 and a document discharging unit 25 to which a document is to be discharged and stacked after the image is read by the image reading apparatus body 902 while being conveyed by the document conveyance unit 23. The document discharging unit 25 is provided below the document stacking unit 21.

The document discharging unit 25 includes a lamp 26 that works as an illumination unit and a discharged-document detection sensor 28 that configures a discharged-document detection unit for detecting that the document is discharged to the document discharging unit 25 (see FIG. 2B). The lamp 26 emits light so that the light is directed to the discharged document.

The lamp 26 is provided on the bottom of the document stacking unit 21. The lamp 26 is provided on the side (front side of the copying machine A) where a user operates the image reading apparatus 2 (copying machine A). The "front side" is a side where the user stands to operate an operation unit for operating the copying machine.

A configuration of the image reading apparatus 2 and the outline of a reading operation will now be described with reference to the cross sectional view in FIG. 3.

The image reading apparatus body 902 has a platen glass 24 on an upper surface. The image reading apparatus body 902 internally includes multiple mirrors 303 that reflect the reflected light from the document, a lens 302 that condenses light, and a charge-coupled device (CCD) sensor 301 that works as an image reading unit.

The document conveyance unit 23 includes a paper supply roller 202 that works as a feeding unit, a separation roller 203. The document conveyance unit 23 further includes a registration roller 205, and conveyance rollers 206 and 207 that work as a conveyance unit. The document conveyance unit 23 further includes a platen roller 208, a post-read roller 209, and a discharging roller 210.

A document 201 on the document stacking unit 21 is supplied internally to the document conveyance apparatus 901 by the paper supply roller 202 provided on the upper part of the document stacking unit 21. The separation roller 203 and a separation pad 204 work together to separate sheets of the document such that the document is conveyed one sheet at a time.

One separate sheet of the document is aligned with a leading edge of the sheet by the registration roller 205. With the leading edge aligned by the registration roller 205, the sheet is conveyed by the conveyance roller 206 and the conveyance roller 207. At the read position where the platen roller 208 is provided, the image is read while the document is being conveyed.

The image of the document is read as follows. The reflected light from the document is reflected by multiple mirrors 303, condensed by the lens 302, and transmitted to the CCD 301 for reading the image.

After the image is read, the document is discharged to the document discharging unit 25 by the discharging roller 210 via the post-read roller 209.

The feed operation sequence described above, in which the document is fed (conveyed) from the document stacking unit 21 and discharged to the document discharging unit 25, is continued until no sheet of the document is left on the document stacking unit 21.

FIG. 6 is the control block diagram of the image reading apparatus 2 in the present exemplary embodiment.

The control unit 1 receives signals from the feed document detection sensor 22, from the discharged-document detection sensor 28, and from the operation unit of the image reading apparatus 2 (in the present exemplary embodiment, the image reading apparatus 2 and the copying machine A share the operation unit). The control unit 1 controls the document conveyance unit 23 and the lamp 26.

The following, with reference to the flowchart in FIG. 4, describes an operation of the lamp 26 that is executed by the control unit 1 of the image reading apparatus 2 when the document reading processing is executed.

In step S31, the control unit 1 determines whether the feed document detection sensor 22 detects a document on the document stacking unit 21. If the feed document detection sensor 22 detects a document, that is, if the user sets a document on the document stacking unit 21, the processing proceeds to step S32. In step S32, the control unit 1 turns on the lamp 26 to illuminate the document discharging unit 25.

In step S33, the control unit 1 controls the document conveyance unit 23 to start conveying sheets of the document. When the document conveyance is terminated in step S34, in step s35, the control unit 1 turns off the lamp 26 to terminate the illumination of the document discharging unit 25.

In the present exemplary embodiment, when the user sets a document on the document stacking unit 21, the control unit 1 turns on the lamp 26, which functions as an illumination unit, to illuminate the document discharging unit 25 as described above. That is, the lamp 26 emits light to illuminate the document discharging unit 25 to make a subsequent user aware that the previous user has forgotten to remove the document of the previous user from the document discharging unit 25 when there is such a document.

The subsequent user removes the document that the previous user has forgotten to remove and then causes the image reading apparatus 2 to read the subsequent user's documents that are set on the document stacking unit 21 by the subsequent user. This lamp operation prevents the previous user's document that is left in the document discharging unit 25 and the subsequent user's documents that are read and discharged to the document discharging unit 25 from being mixed.

This lamp operation also prevents the subsequent user from mistakenly taking the previous user's document with the subsequent user's documents. In addition, this lamp operation prevents a potential paper jam at the discharge port that can be caused by a large volume of sheets of the previous user's document that are left in the document discharging unit 25.

Next, with reference to the flowchart in FIG. 5, the following describes another exemplary embodiment of the lamp operation that is executed by the control unit 1 of the copying machine A as the document reading processing is executed.

In step S41, based on a signal from the feed document detection sensor 22, the control unit 1 determines whether a document is set on the document stacking unit 21. If the control unit 1 determines that a document is set on the document stacking unit 21 in step S41 (YES in step S41), the processing proceeds to step S42. In step S42, based on a signal from the discharged-document detection sensor 28, the control unit 1 determines whether there is any document in the document discharging unit 25.

If a document is detected in the document discharging unit 25 in step S42 (YES in step S42), the processing proceeds to step S43. In step S43, the control unit 1 turns on the lamp 26 to cause the lamp 26 to illuminate the document discharging unit 25.

The processing proceeds to step S44. In step S44, the control unit 1 checks a signal from the discharged-document detection sensor 28 to determine whether the document in the document discharging unit 25 is removed. If the document in the document discharging unit 25 is not removed in step S44, the control unit 1 waits for a feed start signal in step S45. The feed start signal is issued by a Read (Copy) Start button on the operation unit.

If the control unit 1 receives the feed start signal (YES in step S45), the control unit 1 starts the document feed operation and continuously feeds the sheets of the document, stacked on the document stacking unit 21, one sheet at a time. While the document feed operation is performed, the lamp 26 remains on. In other words, while the document feed operation where documents are continuously fed from document stacking unit 21 and discharged to the document discharging unit 25 is performed, the lamp 26 continually emits light.

In step S48, if all sheets of the document on the document stacking unit 21 are fed and the control unit 1 recognizes, based on a signal from the feed document detection sensor 22 (YES in step S47), that there is no document left on the document stacking unit 21, the control unit 1 terminates the document feed operation.

In step S49, the control unit 1 blinks the lamp 26 when the document feed operation is terminated. That is, the control unit 1 switches the light emission state of the lamp 26 from "on" (the state during the feed operation) to "blink" (the state after the feed operation).

If the control unit 1 determines that the document is removed from the document discharging unit 25 based on the signal from the discharged-document detection sensor 28 (YES in step S50), the control unit 1 turns off the lamp 26 (ends the blink in this case) in step S52.

If a predetermined illumination time has elapsed from the end of the feed operation while the document is not removed from the document discharging unit 25 (YES in step S51), the control unit 1 turns off the lamp 26 in step S52. In the present exemplary embodiment, the predetermined illumination time is set to 10 seconds, but any time that would enable practice of the present embodiment is applicable.

If the control unit 1 determines that there is no document in the document discharging unit 25 in step S42, the control unit 1 waits for a feed signal in step S53. That is, if the control unit 1 determines that there is no document in the document discharging unit 25 in step S42, the control unit 1 does not turn on the lamp 26, but waits for the feed start signal.

When the control unit 1 receives the feed start signal (YES in step S53), the control unit 1 starts the feed operation in step S54 and, at the same time, turns on the lamp 26. That is, the control unit 1 keeps the lamp 26 turned on during the feed operation where the sheets of the document stacked on the document stacking unit 21 are continuously fed. Next, the processing proceeds to step S47.

In step S44, if the control unit 1 determines that, based on the signal from the discharged-document detection sensor 28, the document is removed from the document discharging unit 25 before the feed start signal is received while the lamp 26 is on (YES in step S44), the control unit 1 turns off the lamp 26 (step S56) and the processing proceeds to step S53.

In the above-described exemplary embodiment, when the user sets documents on the document stacking unit 21, the control unit 1 turns on the lamp 26. By doing so, the control unit 1 not only makes a subsequent user aware of a document that the previous user has forgotten to remove, but also achieves an effect described below.

If there is one or more documents in the document discharging unit 25 when the user sets documents in the document stacking unit 21, the control unit 1 turns on the lamp 26. In other words, if there is no document in the document discharging unit 25 when the user sets a document on the document stacking unit 21, the control unit 1 does not turn on the lamp 26 to achieve energy saving.

The lamp 26 in the document discharging unit 25, which is turned on during the document feed operation, allows the user to easily recognize where the documents are discharged.

The control unit 1 performs unique control for a light-emitting state of the lamp 26 in such a way that, when the feed operation is terminated, the light-emitting state of the lamp 26 is switched from "on" (document feed in operation) to "blink" (document feed terminated). This unique control in which the light-emitting state is changed attracts the user's attention to the document discharging unit 25 when the feed operation is terminated.

Changing the light-emitting state of the lamp 26 as described above allows the user to recognize that the document discharging is terminated, preventing the user from forgetting to remove documents from the document discharging unit 25. In other words, this unique control addresses the issue that simply turning on the lamp when documents are discharged is insufficient for preventing the user from forgetting to remove the documents.

In the exemplary embodiments described above, the lamp 26 directly illuminates the documents stacked in the document discharging unit 25. However, instead of directly illuminating the stacked documents, turning on the lamp 26 in the document discharging unit 25 also prompts the user to confirm the documents on the document discharging unit 25. This means that illuminating the discharged and stacked documents directly with the lamp is not always required.

The lamp 26, provided in the document discharging unit 25 that is below the document stacking unit 21, should be provided on the front side of the image reading apparatus 2 (copying machine 2), as described above. This configuration allows the user to easily confirm that the lamp 26 is turned on.

In addition, as illustrated in FIG. 2B, the lamp 26 should be installed so that light 27 from the lamp 26 is directed toward the front of the apparatus. This configuration allows the user to easily notice the light of the lamp 26.

In the above-described exemplary embodiments, the control unit 1 turns on the lamp 26 when documents are set on the document stacking unit 21. The control unit 1 may also blink the lamp 26 when documents are set on the document stacking unit 21.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-098424 filed Apr. 26, 2011, which is hereby incorporated by reference herein in its entirety.

What is claimed is:

1. An image reading apparatus comprising:
a stacking unit on which a document to be fed is stacked;
a sensor configured to output a signal indicating that the document has been stacked on the stacking unit;
a feeding unit configured to feed the document stacked on the stacking unit;
an image reading unit configured to read the document fed by the feeding unit;
a discharging unit onto which a document which has been read by the image reading unit is discharged;
an illuminating unit configured to illuminate the discharging unit; and
a control unit configured to turn on the illuminating unit in response to the signal, output by the sensor, indicating that the document has been stacked on the stacking unit before the feeding unit feeds the document.

2. The image reading apparatus according to claim 1, further comprising a second sensor configured to output a signal indicating that a document has been discharged on the discharging unit,
wherein, if the second sensor outputs the signal indicating that the document has been discharged on the discharging unit and the sensor outputs the signal indicating that the document has been stacked on the stacking unit, the control unit turns on the illuminating unit,
if the second sensor does not output the signal indicating that the document has been discharged on the discharging unit and the sensor outputs the signal indicating that the document has been stacked on the stacking unit, the control unit does not turn on the illuminating unit.

3. The image reading apparatus according to claim 2, wherein the control unit turns off the illuminating unit when the second sensor outputs the signal that the document is removed from the discharging unit or when a predetermined time has elapsed from a time at which discharging of the document to the discharging unit is terminated even if the discharged document is on the discharging unit.

4. The image reading apparatus according to claim 1, wherein the control unit is further configured to keep the illuminating unit turned on during a feed operation where the documents are continuously fed from the stacking unit and discharged to the discharging unit, and is configured to cause the illuminating unit to begin blinking when the feed operation is terminated.

5. The image reading apparatus according to claim 1, wherein the control unit is configured to turn on the illuminating unit in response to the signal, output by the sensor, indicating that the document has been stacked on the stacking unit whether there is a document on the discharging unit or not.

6. The image reading apparatus according to claim 2, wherein when the second sensor does not output the signal indicating that the document has been discharged on the discharging unit and the sensor outputs the signal indicating that the document has been stacked on the stacking unit, the control unit turns on the illuminating unit according to a feed start signal.

7. The image reading apparatus according to claim 6, wherein the control unit is configured to keep the illuminating unit turned on during a feed operation of the feeding unit where the documents are continuously fed from the stacking unit and the documents are discharged onto the discharging unit.

8. The image reading apparatus according to claim 7, wherein the control unit is configured to cause the illuminating unit to continually emit the light during the feed operation, and is configured to cause the illuminating unit to begin blinking according to a termination of the feed operation.

9. The image reading apparatus according to claim 2, wherein the control unit turns off the illuminating unit when the second sensor outputs the signal that the document is removed from the discharging unit.

10. The image reading apparatus according to claim 2, wherein the control unit turns off the illuminating unit when a predetermined time has elapsed from a time at which discharging of all documents stacked on the stacking unit to the discharging unit is terminated even if the discharged document is on the discharging unit.

11. The image reading apparatus according to claim 10, wherein the control unit turns off the illuminating unit when the second sensor output the signal that the document is removed from the discharging unit even if the predetermined time has not elapsed.

12. The image reading apparatus according to claim 1, wherein the discharging unit is provided below the stacking unit.

13. An image reading apparatus comprising:
a stacking unit on which a document to be fed is stacked;
a first sensor configured to output a signal indicating that the document has been stacked on the stacking unit;
a feeding unit configured to feed the document stacked on the stacking unit;
an image reading unit configured to read the document fed by the feeding unit;
a discharging unit onto which a document which has been read by the image reading unit is discharged;
a second sensor configured to output a signal indicating that the document has been discharged on the discharging unit;
an illuminating unit configured to illuminate the discharging unit; and
a control unit configured to turn on the illuminating unit if the second sensor outputs the signal indicating that the document has been discharged on the discharging unit and the first sensor outputs the signal indicating that the document has been stacked on the stacking unit, and not to turn on the illuminating unit if the second sensor does not output the signal indicating that the document has been discharged on the discharging unit and the first sensor outputs the signal indicating that the document has been stacked on the stacking unit, and to turn on the illuminating unit according to a feed start signal.

14. The image reading apparatus according to claim 13, wherein the control unit is configured to keep the illuminating unit turned on during a feed operation of the feeding unit where the documents are continuously fed from the stacking unit and the documents are discharged onto the discharging unit.

15. The image reading apparatus according to claim 14, wherein the control unit is configured to cause the illuminating unit to continually emit the light during the feed operation, and is configured to cause the illuminating unit to begin blinking according to a termination of the feed operation.

16. The image reading apparatus according to claim 13, wherein the control unit turns off the illuminating unit when the second sensor outputs the signal that the document is removed from the discharging unit.

17. The image reading apparatus according to claim 13, wherein the control unit turns off the illuminating unit when a predetermined time has elapsed from a time at which discharging of all documents stacked on the stacking unit to the discharging unit is terminated even if the discharged document is on the discharging unit.

18. The image reading apparatus according to claim 17, wherein the control unit turns off the illuminating unit when the second sensor outputs the signal that the document is removed from the discharging unit even if the predetermined time has not elapsed.

19. The image reading apparatus according to claim 13, wherein the discharging unit is provided below the stacking unit.

20. An image reading apparatus comprising:
a stacking unit on which a document to be fed is stacked;
a first sensor configured to output a signal indicating that the document has been stacked on the stacking unit;
a feeding unit configured to feed the document stacked on the stacking unit;
an image reading unit configured to read the document fed by the feeding unit;
a discharging unit onto which a document which has been read by the image reading unit is discharged;
a second sensor configured to output a signal indicating that the document has been discharged on the discharging unit;
a lamp disposed on the discharging unit; and
a control unit configured to turn on the lamp if the second sensor outputs the signal indicating that the document has been discharged on the discharging unit and the first sensor outputs the signal indicating that the document has been stacked on the stacking unit, and not to turn on the lamp if the second sensor does not output the signal indicating that the document has been discharged on the discharging unit and the first sensor outputs the signal indicating that the document has been stacked on the stacking unit.

21. The image reading apparatus according to claim 20, wherein the control unit is configured to turn on the lamp according to a feed start signal.

22. The image reading apparatus according to claim 1, wherein if the controller receives a feed start signal, the controller starts to feed the document, and
wherein the controller turns on the illuminating unit in response to the signal output by the sensor before the controller receives the feed start signal.

* * * * *